Patented July 11, 1933

1,917,405

UNITED STATES PATENT OFFICE

ERNEST R. TAYLOR, OF ROCHESTER, NEW YORK, ASSIGNOR TO EASTMAN KODAK COMPANY, OF ROCHESTER, NEW YORK, A CORPORATION OF NEW YORK

CELLULOSE ESTER COMPOSITION

No Drawing.    Application filed March 1, 1929.  Serial No. 343,853.

This invention relates to new compositions of matter in which cellulose esters are combined or mixed with other substances so that the resulting products may be advantageously used in the plastic and analogous arts, for example in varnish and film manufacture.

In the manufacture of products from cellulose esters, it is customary to combine the ester with various organic substances in order to enhance the plasticity and the flexibility of the material. In the photographic art, and particularly in the manufacture of motion picture film, it is very essential that the film be as non-inflammable as possible. Numerous compounds have been suggested for imparting to these esters slow-burning properties. Moreover, the flexibility, transparency, and the film flowing qualities of the compositions must not be decreased by the added ingredients.

The object of the present invention is to provide a composition of matter, particularly cellulose ester composition, combined with a substance which results in a product having the hereinabove described properties.

I have found that the bromine substituted aryl esters of the aromatic sulphonic acids impart to cellulose ester compositions many of the above enumerated qualities. Furthermore, they are adapted for use in either the cellulose acetate or cellulose nitrate compositions. Their use, however, appears to be more desirable and result in a more marked advantage when used in the cellulose acetate composition.

The 2-4-6 tribromophenyl-p-toluene sulphonate and the dibromocresyl-p-toluene sulphonate are examples of these materials which, when incorporated in a cellulose ester composition, result in clear, flexible and slow-burning products which, in the sheet or film form, impart improved flatness. It will, of course, be understood that the closely related bromine substituted phenyl esters of the aromatic sulphonic acids are also suitable.

I will now give several examples of my invention but it will be understood that I shall not be restricted by the proportions or compounds therein given except as noted in the appended claims.

100 parts of cellulose acetate are combined with 300 to 500 parts of acetone to which solution 5 to 40 parts of 2-4-6 tribromophenyl-p-toluene sulphonate are added.

In my preferred example 100 parts of cellulose acetate are dissolved in 400 parts of acetone to which 20 parts of 2-4-6 tribromophenyl-p-toluene sulphonate are added.

The films obtained upon evaporation of the solvent from the above "dopes" are clear transparent and have a high degree of non-inflammability. They are, therefore, particularly fitted for use in the photographic art.

In the manufacture of cut and sheet films, and particularly the former, it is very important that the film have a non-curling tendency. The use of the herein described softeners results in imparting a greater degree of flatness to the resulting films than is obtained by many of the softeners that are present in use. It also increases the flexibility and in no way affects the transparency of the films.

I have likewise found that the flexibility of the cellulose acetate film may be considerably increased by the addition thereto of such compounds as tetrahydrofurfuryl alcohol or monoethyl ether of triethylene glycol in conjunction with the bromine substituted acyl ester of p-toluene sulphonate. The proportions in which they are added may vary in such a degree as to impart to the film the desired flexibility. A very useful film results from the addition of approximately 10 parts of one of the above flexibility inducing compounds with approximately 20 parts of the softener and 70 parts of cellulose acetate. For other products smaller or larger amounts of the alcohol or ether may be added to decrease or increase the flexibility, as will be understood by those familiar with the art.

These softeners may be used in conjunction with the various other solvents and plastifiers. In order to increase the fluidity of the various compositions non-solvents such as alcohol or benzol may be added, but in amounts insufficient to precipitate the cellulose ester. Intermediate boilers may be used to retard the too rapid coagulation of the surface of the coated film. The higher boiling softeners may also be used as for example triphenyl phosphate, tricresyl phosphate, and monochloronaphthalene to impart plasticity to the product.

The addition agent hereinabove described, or its chemical equivalents may be successfully used in cellulose ester compositions in varying proportions together with the flexibility inducing agents without in any way departing from this invention or sacrificing any of its advantages.

Having thus described my invention, what I claim as new and desire to secure by Letters Patent is:

1. A composition of matter comprising a cellulose ester and a bromine substituted aryl ester of an aromatic sulphonic acid selected from the group consisting of 2:4:6 tribromophenyl p-toluene sulphonate and dibromocresyl p-toluene sulphonate.

2. A composition of matter comprising a cellulose ester and 2-4-6 tribromophenyl-p-toluene sulphonate.

3. A composition of matter comprising cellulose acetate and a bromine substituted aryl ester of an aromatic sulphonic acid selected from the group consisting of 2:4:6 tribromophenyl p-toluene sulphonate and dibromocresyl p-toluene sulphonate.

4. A composition of matter comprising cellulose acetate and 2-4-6 tribromophenyl-p-toluene sulphonate.

5. An article of manufacture comprising a sheet of deposited or flowed cellulose ester comprising a bromine substituted aryl ester of an aromatic sulphonic acid selected from the group consisting of 2:4:6 tribromophenyl p-toluene sulphonate and dibromocresyl p-toluene sulphonate.

6. An article of manufacture comprising a sheet of deposited or flowed cellulose acetate comprising a bromine substituted aryl ester of an aromatic sulphonic acid selected from the group consisting of 2:4:6 tribromophenyl p-toluene sulphonate and dibromocresyl p-toluene sulphonate.

7. A composition of matter comprising a cellulose ester and dibromocresyl p-toluene sulphonate.

8. A composition of matter comprising cellulose acetate and dibromocresyl p-toluene sulphonate.

9. An article of manufacture comprising a sheet of deposited or flowed cellulose ester comprising 2:4:6-tribromophenyl p-toluene sulphonate.

10. An article of manufacture comprising a sheet of deposited or flowed cellulose ester comprising dibromocresyl p-toluene sulphonate.

11. An article of manufacture comprising a sheet of deposited or flowed cellulose acetate comprising 2:4:6-tribromophenyl p-toluene sulphonate.

12. An article of manufacture comprising a sheet of deposited or flowed cellulose acetate comprising dibromocresyl p-toluene sulphonate.

Signed at Rochester, New York, this 22nd day of February 1929.

ERNEST R. TAYLOR.